United States Patent
Berkcan et al.

(10) Patent No.: US 9,222,817 B2
(45) Date of Patent: Dec. 29, 2015

(54) SYSTEMS AND METHODS FOR HYBRID FLOW SENSING

(71) Applicant: Amphenol Corporation, Wallingford, CT (US)

(72) Inventors: Ertugrul Berkcan, Niskayuna, NY (US); Michael Klitzke, Niskayuna, NY (US); Nannan Chen, Niskayuna, NY (US); Cheng-Po Chen, Niskayuna, NY (US); Yizhen Lin, Niskayuna, NY (US)

(73) Assignee: Amphenol Thermometrics, Inc., St. Marys, PA (US)

( * ) Notice: Subject to any disclaimer, the term of this patent is extended or adjusted under 35 U.S.C. 154(b) by 57 days.

(21) Appl. No.: 13/969,041

(22) Filed: Aug. 16, 2013

(65) Prior Publication Data
US 2014/0260669 A1 Sep. 18, 2014

Related U.S. Application Data

(60) Provisional application No. 61/798,771, filed on Mar. 15, 2013.

(51) Int. Cl.
*G01F 1/20* (2006.01)
*G01F 1/712* (2006.01)
*G01F 1/708* (2006.01)

(52) U.S. Cl.
CPC .............. *G01F 1/712* (2013.01); *G01F 1/7082* (2013.01)

(58) Field of Classification Search
USPC ............... 73/861.32, 861.22, 861.42, 861.08, 73/861.24; 702/45
See application file for complete search history.

(56) References Cited

U.S. PATENT DOCUMENTS

| | | | |
|---|---|---|---|
| 3,664,190 A * | 5/1972 | Brunner et al. | 73/861.22 |
| 4,006,634 A | 2/1977 | Billette et al. | |
| 4,827,774 A | 5/1989 | Silverwater | |
| 4,841,780 A | 6/1989 | Inada et al. | |
| 4,993,269 A | 2/1991 | Guillaume et al. | |
| 5,038,621 A | 8/1991 | Stupecky | |
| 5,367,911 A * | 11/1994 | Jewell et al. | 73/861.08 |
| 6,289,746 B1 | 9/2001 | Fu et al. | |
| 6,435,040 B1 | 8/2002 | Feller | |
| 6,651,511 B1 * | 11/2003 | Young | 73/861.08 |
| 6,729,192 B1 * | 5/2004 | Feller | 73/861.77 |
| 6,895,823 B1 | 5/2005 | Herrmann et al. | |
| 7,328,624 B2 * | 2/2008 | Gysling et al. | 73/736 |
| 7,398,165 B1 * | 7/2008 | Miau | 702/45 |
| 7,480,577 B1 | 1/2009 | Feller | |

(Continued)

FOREIGN PATENT DOCUMENTS

WO    WO 2005/067515    7/2005

*Primary Examiner* — Jewel V Thompson
(74) *Attorney, Agent, or Firm* — Blank Rome LLP

(57) ABSTRACT

Systems and method for flow sensing are provided. One system includes a flow conduit configured to allow fluid flow therethrough, a flow disturber disposed in the flow conduit and configured to impart a flow disturbance to the fluid flow and an actuator operably connected to the flow disturber to control the flow disturber to impart the flow disturbance to the fluid flow. The system further includes a plurality of sensors disposed in the flow conduit that are configured to have a geometrical and functional relationship with the flow conduit and the flow disturber, wherein the plurality of sensors are responsive to flow characteristics in the flow conduit. The system also includes a processor operably coupled to the plurality of sensors and configured to determine a flow rate of the fluid flow in the flow conduit using timing characteristics to select a processing method.

23 Claims, 11 Drawing Sheets

(56) References Cited

U.S. PATENT DOCUMENTS

| | | |
|---|---|---|
| 7,726,201 B2 | 6/2010 | Mattar et al. |
| 7,894,061 B2 | 2/2011 | MacDougall et al. |
| 8,201,459 B2 | 6/2012 | Henry et al. |
| 8,364,427 B2 | 1/2013 | Berkcan et al. |
| 2002/0129662 A1* | 9/2002 | Gysling et al. ............. 73/861.42 |
| 2006/0005834 A1 | 1/2006 | Aylsworth et al. |
| 2011/0125424 A1 | 5/2011 | Han et al. |
| 2011/0166800 A1 | 7/2011 | Berkcan et al. |

* cited by examiner

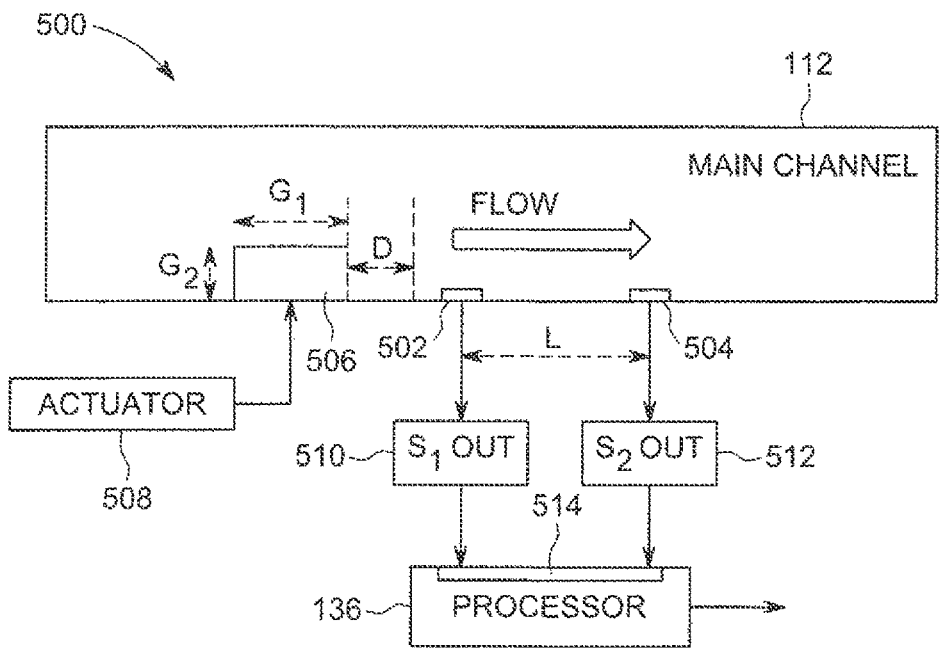
FIG. 5
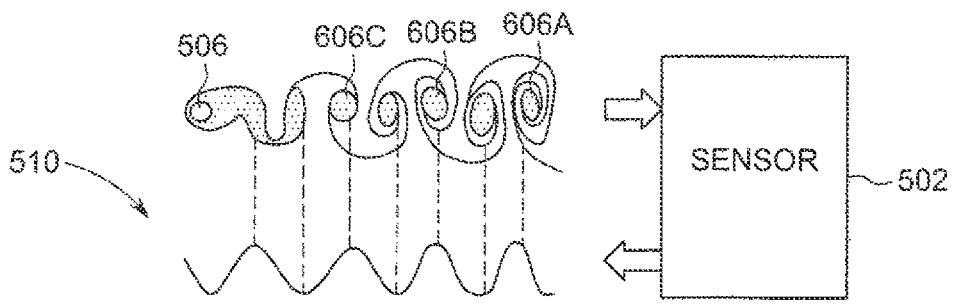
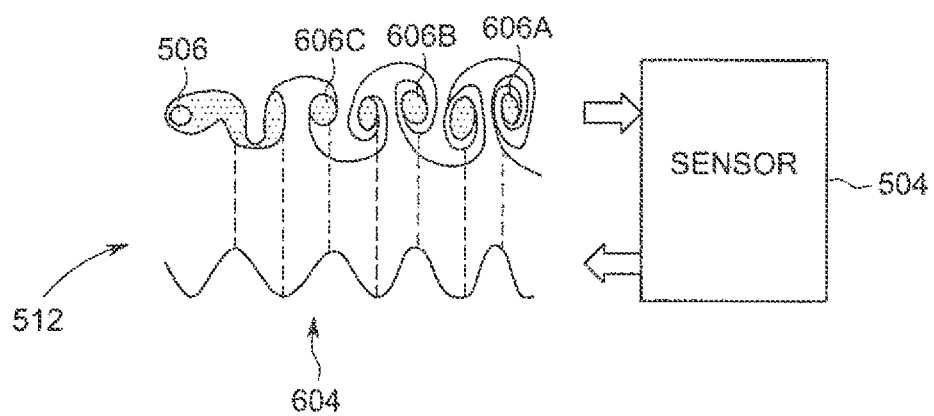
FIG. 6

SYSTEMS AND METHODS FOR HYBRID FLOW SENSING

CROSS-REFERENCE TO RELATED APPLICATIONS

This application claims priority to and the benefit of the filing date of U.S. Provisional Application No. 61/798,771, filed on Mar. 15, 2013, entitled "Systems And Methods For Hybrid Flow Sensing," which is hereby incorporated by reference in its entirety.

BACKGROUND

Flow sensing may be used in a variety of different applications. For example, flow sensing may be used in ventilation and respiration machines to detect and control the level of air flow.

Ventilation and respiration machines have been used for many years in hospitals, assisted living quarters, and other locations. These devices are often used to treat respiratory ailments. For example, some individuals suffer from some form of respiratory issue during sleep, such as sleep apnea. Many of these people utilize ventilation and/or respiratory machines to assist in nighttime sleeping. Two types of such machines are a continuous positive airway pressure (CPAP) machine and a variable positive airway pressure (VPAP) machine.

When using these ventilation and/or respiratory machines, it is important to be able to accurately determine the flow rate of ventilation and/or respiration. For example, the air supply pressure from these machines is varied based on whether the person is breathing in or out, such as during inspiration and expiration phases of the respiratory system. By properly controlling the air flow during different phases of breathing, a more comfortable process can result. The more comfortable the ventilation and/or respiratory machine is to a person during use, the more likely the person is to continue to use the ventilation and/or respiratory machine. Users of ventilation and/or respiratory machines may unilaterally decide to cease use of the machine as a result of the machine being uncomfortable during operation, such as when an appropriate air pressure is not supplied.

However, due to the complex nature of breathing and the change in direction and speed of air flow during breathing, it is very difficult to determine flow rates, particularly along a spectrum of different flow levels from a very low flow rate to a very high flow rate.

BRIEF DESCRIPTION

In accordance with various embodiments, a flow sensor assembly is provided that includes a flow conduit configured to allow fluid flow therethrough, a flow disturber disposed in the flow conduit and configured to impart a flow disturbance to the fluid flow and an actuator operably connected to the flow disturber to control the flow disturber to impart the flow disturbance to the fluid flow. The flow sensor assembly further includes a plurality of sensors disposed in the flow conduit that are configured to have a geometrical and functional relationship with the flow conduit and the flow disturber, wherein the plurality of sensors are responsive to flow characteristics in the flow conduit. The flow sensor assembly also includes a processor operably coupled to the plurality of sensors and configured to determine a flow rate of the fluid flow in the flow conduit, wherein the processor uses timing characteristics in selecting a processing method for determining the flow rate.

In accordance with other various embodiments, a method for determining fluid flow is provided. The method includes configuring a flow conduit to allow fluid flow therethrough, positioning within the flow conduit a flow disturber configured to impart a flow disturbance to the fluid flow, and providing a plurality of sensors within the flow conduit, wherein the plurality of sensors are configured to detect along a direction of travel in the flow conduit, flow disturbances including vortices. The method further includes processing signals responsive to the detected flow disturbances to determine a flow rate of the fluid flow in the flow conduit, wherein the processing includes using timing characteristics related to the detected disturbances to select a processing method for determining the flow rate.

BRIEF DESCRIPTION OF THE DRAWINGS

FIG. 5 is schematic illustration of flow sensor in accordance with various embodiments illustrating time of arrival information.

FIG. 6 is a diagram illustrating flow disturbance detection for flow determinations in accordance with various embodiments.

DETAILED DESCRIPTION

The following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Although the various embodiments may be described herein within a particular operating environment, for example in connection with a particular ventilation and/or respiratory machine, it should be appreciated that one or more embodiments are equally applicable for use with other configurations and systems. For example, the various embodiments may be used in different medical and non-medical applications.

Various embodiments provide systems and methods for fluid flow rate determination using one or more flow sensors. For example, various embodiments use flow sensors to determine the flow rate of air within ventilation and/or respiratory machines, such as continuous positive airway pressure (CPAP) machines and variable positive airway pressure (VPAP) machines. In some embodiments, based on a particular flow regime or flow rate, different characteristics (e.g., amplitude and time characteristics) of flow sensor responses are used to determine the flow rate. At least one technical effect of various embodiments is flow sensing with a wide dynamic range and improved accuracy, which may be provided for these machines.

Figure 1:
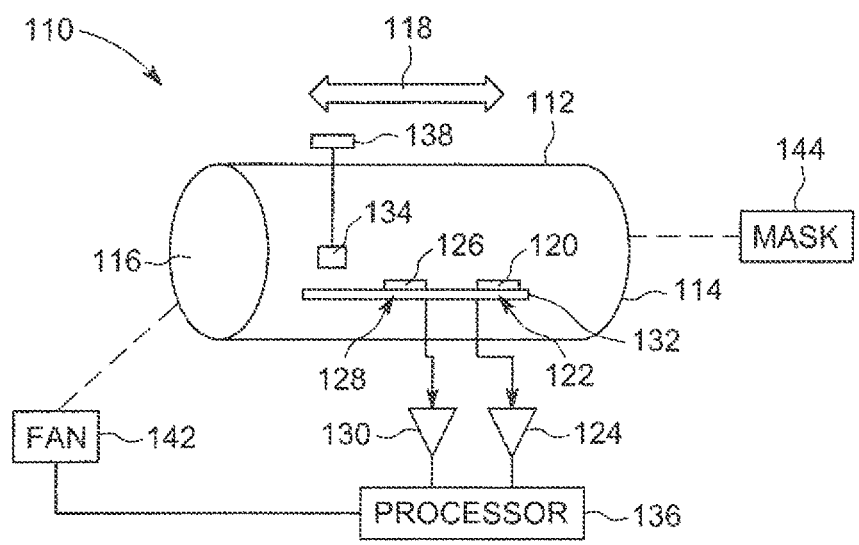
FIG. 1 is schematic illustration of a flow sensor in accordance with various embodiments.

FIG. 1 illustrates schematically a flow sensor assembly 110 in accordance with an embodiment that may be used, for example, with a CPAP or VPAP machine to control the flow of air to a user, such as to provide varying levels of positive airway pressure to a user when sleeping. The flow sensor assembly 110 in various embodiments is configured to determine fluid flow rates using a hybrid detection method that utilizes different methods of flow detection at different fluid flow rates. In general, one or more sensors, illustrated as two sensors 120 and 126, are disposed within a flow conduit 112 at first and second positions to have a geometrical and functional relationship with the flow conduit 112 and a flow disturber 134 within the flow conduit 112. It should be noted that different numbers of sensors may be provided within the flow conduit 112. For example, a plurality of pairs or sets of sensors may be disposed within the flow conduit 112, such as at different locations along the flow conduit 112. Accordingly, in some embodiments, a plurality of sensors 120 and 126 are positioned in a spaced apart relationship within and along the flow conduit 112.

The sensors 120 and 126 are responsive to disturbances within the conduit 112 imparted by the flow disturber 134 and configured to generate signals responsive to the flow characteristics. For example, the disturbances may include a disturbance of the fluid flow, pressure fluctuations in the flow conduit 112, and heat transfer of the flow, among others. Accordingly, a disruption in the fluid flow creates certain characteristics, which may include vortices or pressure/flow pulses that can be sensed and analyzed. In particular, fluid flow will have a certain direction, velocity, pressure, and temperature associated therewith. By generating a disruption in the fluid stream, the velocity is altered, as are the pressure and temperature. These changes can be detected and analyzed to determine fluid flow rate within the flow conduit 112.

For example, in various embodiments, a processor 136 is operably connected to the sensors 120 and 126 to receive signals characteristic of the flow disturbances and uses different characteristics to determine fluid flow rate depending on a flow regime (e.g., defined by ranges of flow levels) within the flow conduit 112. In various embodiments, the different characteristics may include amplitude characteristics, time characteristics, and/or frequency characteristics, among others.

With respect particularly to the flow sensor assembly 110 that includes the pair of sensors 120, 126, which may be different types of sensing elements as described in more detail herein, each of the sensors 120, 126 is positioned within the conduit 112 that has an upstream opening 114 and a downstream opening 116. It should be understood that the terms "upstream" and "downstream" are relative terms that are related to the direction of flow 118, such as the flow of air. Thus, in some embodiments, if the direction of flow 118 extends from element 116 to element 114, then element 116 is the upstream opening and element 114 is the downstream element. For ease of description, the upstream side of the flow sensor assembly 110 will be the side closest to the opening 114 and the downstream side of the assembly will be the side closest to the opening 116.

The flow disturber 134 is positioned within the conduit 112, which in the illustrated embodiment is adjacent the sensor 126, and may be immediately adjacent (abutting) or spaced a distance apart from the sensor 126. It should be noted that the spacing between the sensors 120, 126, as well as the spacing between the one sensor (illustrated as sensor 126) and the flow disturber 134 may be varied, and may be the same or different. Thus, the sensors 120, 126 may be positioned at different distances from the flow disturber 134. In one embodiment, the sensors 120, 126 are coupled or mounted on a printed circuit board (PCB) 132 at, respectively, first and second positions 122, 128, which are illustrated as downstream from the flow disturber 134.

In operation, the flow disturber 134 is configured to form turbulence within the flow stream, such as, for example, waves or eddies, or vortices, where the flow is mostly a spinning motion about an axis (e.g., an imaginary axis), which may be straight or curved. Additionally, vortex shedding, for example, occurs as an unsteady oscillating flow that takes place when a fluid such as air flows past a blunt body such as the flow disturber 134 at certain velocities, depending on the size and shape of the body.

In various embodiments, the flow disturber 134 is an active device. However, a passive device may be used in some embodiments. In particular, in the illustrated embodiment, an actuator 138 (e.g., a motor or micro-motor and controller) is coupled to the flow disturber 134 to actuate the flow disturber 134 to impart disturbances within the flow conduit 112. It should be noted that more than one flow disturber 134 may be disposed within the flow conduit 112. For example, a pair of flow disturbers 134 may be provided that are disposed symmetrically with respect to the sensors 120, 126, such as symmetrically on opposite sides of the sensors 120, 126, respectively.

In operation, the actuator 138 is configured to control the flow disturber 134 such that the disturbance generated and imparted to the flow within the flow conduit 112 is modulated by the actuator 138. In various embodiments, the flow disturber 134 is configured to move within the flow conduit 112. For example, the actuator 138 in various embodiments is configured to impart a motion on the flow disturber 134 to generate the flow disturbance. The actuator 138 may impart different motions on the flow disturber 134 in various embodiments, such as a rotation, an oscillation, a vibration, a flapping, a pumping, and/or a pulsing, or combinations thereof, among others. For example, the modulated disturbance generated within the flow conduit 112 may include the injection or imparting of a pulse of heat, a puff or dispersion of air, a pressure pulse, and/or a pulse of chemical tracer, or combinations thereof, among others. For example, in one embodiment, the flow disturber 134 is actuated to move similar to the wings of a bird or bat to impart vortices within the fluid flow.

In various embodiments, the sensors 120, 126 are responsive to one or more flow characteristics and configured to acquire measurements and send signals to, respectively signal conditioners 124, 130. The signal conditioners 124, 130 condition the signals by, for example, filtering or amplifying the received signals, prior to sending the signals to anti-aliasing filters and the processor 136 for analysis. For example, the signals generated by the sensors 120, 126 are communicated to the processor 136 that is configured to process the signals to determine a flow rate within the conduit 112. As described in more detail herein, the processor 136 may be configured to determine a flow rate based on a first algorithm (e.g., algorithm using a cross-correlation function) employing a first characteristic in a first flow regime and a second algorithm (e.g., algorithm using a fast Fourier transform (FFT)) employing a second different characteristic in a second different flow regime. In various embodiments, the actuator 138 is configured to actuate the flow disturber 134 by employing a first modulation of the flow disturber 134 in the first flow regime and a second modulation of the flow disturber 134 in the second flow regime, which may be different, such as having a different type, frequency and/or speed of motion that is imparted on the flow disturber 134. It should be noted that the ranges of flow rates defining the first and second flow regimes may be partially overlapping in some embodiments. For example, in some embodiments, the maximum value of one range is less than the maximum value of another range. As another example, in different ranges, different signal or flow characteristics may be used depending on the range. However, in an overlap region, multiple signal or flow characteristics may be used. Accordingly, the correlation of measurements using multiple characteristics in this overlap region may be used when analyzing measurements in non-overlap regions using only one of the characteristics (or less than the number of characteristics used in the overlap region).

It also should be noted that the locations of one or more of the first and second positions 122, 128, the shape of the flow disturber 134, the positioning of the flow disturber 134 relative to the sensors 120, 126 and within the conduit 112, and the size and positioning of the PCB 132 may be varied as desired or needed to generate particular disturbances within the conduit 112 and to allow measurement of the disturbances, such as to allow measurement of different signal characteristics as described herein.

Figure 2:
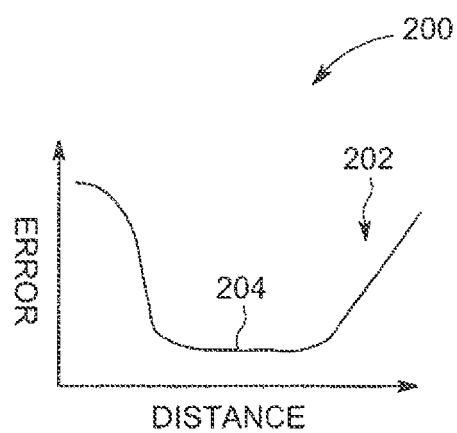
FIG. 2 is a graph illustrating a curve of error versus distance in accordance with various embodiments.

For example, one or both of the sensors 120, 126 are positioned a defined distance from the flow disturber 134 to allow detection of the turbulent vortices or pressure/flow pulses generated or caused by the flow disturber 134, in particular, within a distance where the disturbances have been formed, but not decayed to the point of being undetectable. These disturbances can be largely turbulent in nature. Thus, there are regions located at a distance from the flow disturber 134, at which the sensors 120, 126 are positioned and which have a geometrical relationship wherein the error in the sensor reading is reduced or minimized. The relationship between error and the distance the sensor is from the flow disturber 134 is illustrated in the graph 200 of FIG. 2. As can be seen by the curve 202, there is a region 204 where the error of the sensor output is low and relatively unchanging, which is where the sensors 120, 126 are positioned. It should be noted that although only one flow disturber 134 is shown in FIG. 1, two or more flow disturbers 134 may be utilized within the conduit 112.

In operation, the characteristics, such as the vortices or disturbances in the form of pulses of flow that can be determined are, for example, flow speed, flow direction, the pressure of the flow, the temperature of the flow, the change in velocity of the flow, the change in pressure of the flow, and the heat transfer of the flow. Thus, the sensors 120, 126 can be any type of sensor capable of sensing any one or more of these disturbances. For example, the sensors 120, 126 may be configured to determine pressure, temperature, change in pressure, change in temperature, or change in flow rate. In one embodiment, the sensors 120, 126 are pressure sensors or temperature sensors. In another embodiment, the sensors 120, 126 are heaters. In yet another embodiment, the sensors 120, 126 are microelectromechanical (MEMS) devices.

In some embodiments, such as wherein the flow sensor assembly 110 forms part of a CPAP or VPAP machine, a fan 142 (and control motor) is in fluid connection with the conduit 112 to generate a flow of fluid, in this embodiment, air, through the conduit 112. A mask 144 is in fluid connection with the conduit 112, which may be configured as or form part of a flexible tube that is fluid connection with the fan 142. The fan 142 is also communicatively coupled to the processor 136 to allow control of the fan 142. For example, the processor 136 uses signals received from the sensors 120, 126 to control the operation of the fan 142, such as to vary the level of the speed of the fan 142 or turn the fan 142 on or off, which controls a flow of air to a the mask 144 that may be worn by a person. In some embodiments, the flow of air through the conduit 112 to the mask 144 is controlled based on an analysis of the signals from the sensors 120, 126 characteristic of the measured disturbances within the conduit 112.

Figure 3:
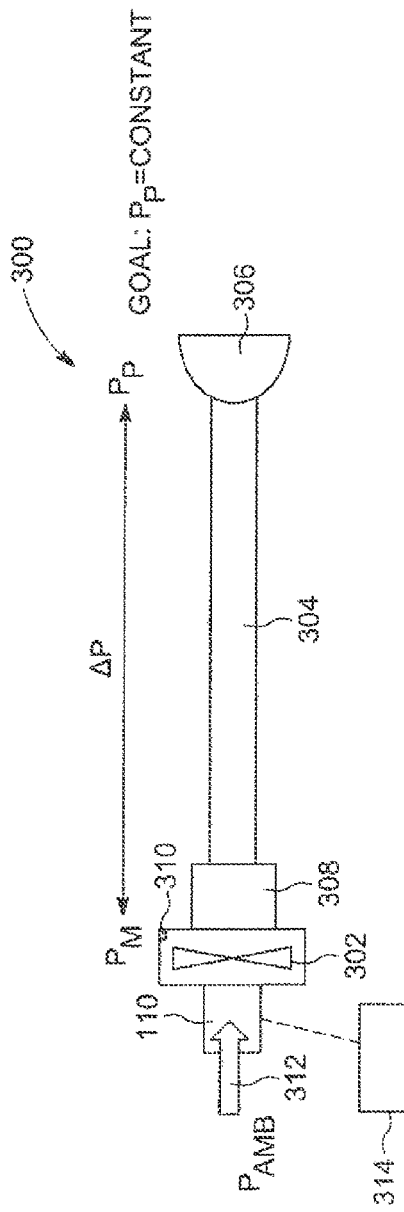
FIG. 3 is a schematic illustration of a ventilation apparatus in accordance with various embodiments.

For example, FIG. 3 schematically illustrates a ventilation assembly 300 in accordance with one embodiment. The ventilation assembly may be, for example, a CPAP or a VPAP machine. The ventilation assembly 300 includes the flow sensor assembly 110, a fan 302 (which may be embodied as the fan 142 shown in FIG. 1), a tube 304, and a mask 306 (which may be embodied as the mask 144 shown in FIG. 1). Optionally, a humidifier 308 can be included upstream of the tube 304. In addition, a pressure sensor 310 may be located within the fan 302. While illustrated upstream of the fan 302, the flow sensor assembly 110 may instead be positioned further downstream, for example within the tube 304.

In operation, there is an ambient pressure $P_{amb}$ in the fluid flow 312 entering the flow sensor assembly 110. The fan 302 is provided to create a higher pressure $P_M$ that is used to facilitate the movement of a fluid through the tube 304 to the mask 306. There will be a pressure drop ($\Delta P$) along the tube 304 between the higher pressure $P_M$ at the fan 302 and the lower pressure $P_P$ at the patient wearing the mask 306. The ventilation assembly 300 is configured to maintain a constant or substantially constant pressure $P_P$. In various embodiments, a processor 314 (which may be embodied as the processor 136 shown in FIG. 1) is operably connected to the flow sensor assembly 110 and fan 302 to control the amount of air supplied through the tube 304, which may be varied. For example, the speed of the fan 302 may be varied, or turned on or off, to control the pressure $P_P$.

Figure 4:
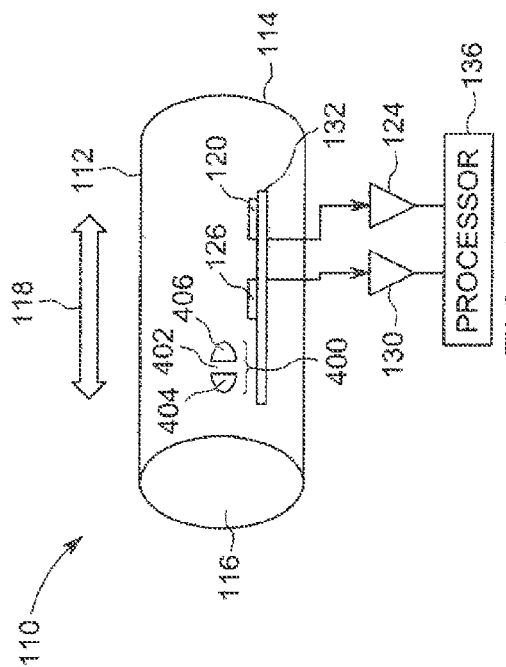
FIG. 4 is a schematic illustration of a flow sensor in accordance with various embodiments.

It should be noted that variations and modifications are contemplated. For example, different types of sensors 120, 126 may be used. Additionally, different types of flow disturbers 134 may be used that are configured to impart a disturbance to the flow within the conduit 112. For example, FIG. 4 illustrates the flow sensor assembly 110 having a different flow disturber 400. The flow disturber 400 includes a first part 402 separated from a second part 404 (e.g., each being half-cylindrical in shape) by a flow separator 406, such as to form a channel or gap therebetween. The first and second parts 402, 404 in one embodiment are blunt flow disturbers. Although shown as being separate elements, the first and second parts 402, 404 instead may be opposite sides of a single flow disturber that has the flow separator 406 formed in a middle portion thereof.

The flow disturber 400 may be positioned orthogonal to the fluid flow direction through the conduit 112, such as coupled on opposing sides of the conduit 112. Additionally, the PCB 132 may include fastening elements (e.g., arms) to allow proper positioning within the conduit 112 and coupled to sides of the conduit 112.

It should be noted that variations and modifications are contemplated. For example, two or more temperature sensors may be provided, such as adjacent the sensors 120, 126 and used to determine the direction of flow within the flow conduit 122. In particular, the difference in the amount of heat detected or measured by two of the temperature sensors can be used to determine the direction of flow.

As examples of other variations, while the PCB 132 may have arms, the PCB 132 may be coupled to a lower portion of the conduit 112 (shown in FIG. 1) using anchors or other fasteners. It should be noted that signals from the PCB 132 and the sensors 120, 126 may be communicated from the conduit 112 through electrical pins (not shown). Additionally, the conduit 112 may further include a straightener section that conditions the flow through the conduit 112. For example, the straightener section may include a screen to assist in transitioning turbulent flow back into laminar flow.

Various embodiments provide for determining fluid flow using different sensor signal characteristics within different flow regimes. Additionally, in some embodiments, the sensor signals in a first flow regime are used to calibrate the sensor signals in a second flow regime. In one embodiment, the first characteristic is an amplitude characteristic of the sensor signals and the second characteristic is a time characteristic of the sensor signals. Also, in various embodiments, using a threshold based on amplitude or time or timing characteristics (e.g., time of arrival) of the detected flow disturbances at the sensors 120, 126, which is based on the speed at which the flow disturbances are traveling within the flow conduit 112, and hence, the time of travel of the flow disturbances between the sensors 120, 126, measured responses may be processed to determine or infer the flow rate in the conduit 112 as described in more detail herein. For example, pulses generated by the flow disturber 134 travel downstream within the flow conduit 112 at the speed of the flow of the fluid within the flow conduit 112, and as the flow speed decreases, the frequency of the detected vortices increases (i.e., less distance between imparted disturbances), such that in some embodiments, multiple vortices are detected at a first sensor (e.g., the sensor 126 in FIG. 1) before one of those multiple vortices is detected by a second sensor (e.g., the sensor 120 in FIG. 1).

Thus, in various embodiments, different methods for determining flow rate are used based on flow regimes determined in part by the rate of travel of the disturbances within the flow conduit 112, such as the rate at which disturbances are detected by the sensors 120, 126. For example, in ventilation machines, the flow rate is constantly changing. For such machines used to treat sleep apnea, the rate of air will change from a high rate (during normal inhalation/exhalation) to a zero flow rate (during periods of time when the patient has stopped breathing). In accordance with various embodiments, multiple flow rate regimes (e.g., two regimes in one embodiment) may be defined, and different algorithms or processing schemes used to analyze the flow changes based on the flow rate regime.

For example, FIG. 5 illustrates a flow sensor assembly 500, which may be embodied as the flow sensor assembly 110 (shown in FIG. 1). The flow sensor assembly 500 includes two sensors 502, 504 (which may be embodied as the sensors 126, 120) positioned within the flow conduit 112 a distance from a flow disturber 506 (which may be embodied as the flow disturber 134 shown in FIG. 1). Optionally, when the flow disturber is an active flow disturber, such as capable of movement within the flow conduit 112 (versus a non-moving passive flow disturber), an actuator 508 (which may be embodied as the actuator 138 shown in FIG. 1) is provided to effect movement of the flow disturber 506, such as rotational movement of a cylindrical disturber element or flapping movement of a disturber element in the general shape of animal wings.

Thus, two sensing elements, illustrated as the two sensors 502, 504 are provided per direction of travel within the flow conduit 112. For example, as shown in FIG. 5, the flow direction is illustrated by the Flow arrow and any disturbances within the flow generated by the flow disturber 506 are detected by both of the sensors 502, 504. Accordingly, the sensors 502, 504 are configured to detect disturbances that are periodic or non-periodic. As described in more detail below, different thresholds may be used to identify vortices, as well as to determine whether to process signals received from one or both of the sensors 502, 504. For example, determinations of a single or multiple vortex condition or other time of arrival information may be used in various embodiments.

In particular, the sensors 502, 504 are configured to generate output signals (illustrated as signals 510, 512, respectively) as described herein and that may be conditioned as described herein. However, in various embodiments, while both of the signals 510, 512 may be used in an initial threshold determination, only one of the signals 510 or 512 is processed to determine the flow rate within the conduit 112. It should be noted that in some embodiments, only one of the sensors 510, 512 may be provided. Thus, in various embodiments one or more of the sensors 510, 512 are provided and/or output a signal, which is received by the controller 136. The processor 136 in various embodiments also may include a threshold module 514 that receives the signals 510, 512 and determines whether the received sensed information from the sensors 502, 504 are to be processed using an algorithm or processing method corresponding to a first flow rate regime or a second flow rate regime. In general, the first flow rate regime is defined by when the fluid flow is at a rate such that a vortex is detected by both sensors 502, 504 before a subsequent vortex is detected by the first sensor 502 (the upstream sensor closer to the flow disturber 506). Additionally, the second flow rate regime is defined by when the fluid flow is at a rate such that a plurality of vortices are detected by one of the sensors, namely the upstream sensor 502 before a first one of the plurality of vortices is subsequently detected by the other one of the sensors, namely the downstream sensor 504, for example, as fluid flow within the flow conduit 112 decreases.

In operation, the flow disturber 506 may actively impart a disturbance to the flow within the conduit 112. The imparted disturbance is related to the geometric dimensions of the flow disturber, illustrated as $g_1$ and $g_2$. Additionally, in the embodiment of an active disturber (e.g., moving or flapping disturber element), the imparted disturbance is related to the motion or movement of the flow disturber.

The imparted disturbance travels within the conduit 112, for example, a distance d, in a given time period, which is based on the flow rate within the conduit 112. As can be appreciated, as the fluid flow rate decreases, the distance d traveled per given or defined time period also decreases.

When a threshold flow rate ($F_{TH}$) is reached, such that flow rate has decreased wherein the distance traveled between imparted disturbances is less than the distance L between the sensors 502, 504, various embodiments utilize different flow rate regime processing methods as described herein.

For example, the sensors 502, 504 as shown in FIG. 6 are monitoring the flow within the conduit, such as to detect the presence of disturbances therein, which in various embodiments is imparted or generated by the flow disturber 506 (shown in FIG. 5). It should be noted that the flow disturber 506 may be a passive device, for example, a structure within the conduit 112 (shown in FIG. 1) that does not move and which creates a disturbance in the fluid flow within the conduit 112. In other embodiments, the flow disturber 506 may be an active device, for example, a structure (e.g., cylinder or plate) that moves, such as rotates or flaps, to create a disturbance in the fluid flow within the conduit 112. In some embodiments, the active structure may create a pulse wave (e.g., a heat wave) within the conduit 112.

In response to the created disturbance within the conduit 112, the sensors 502, 504 generate the output signals 510, 512, respectively, which in some of the various embodiments is a sinusoidal waveform (as illustrated in FIG. 6) resulting from the periodic nature of the vortices 606 of the disturbance (which corresponds to the peaks in the output signals 510, 512). This disturbance pattern may be referred to as a vortex street, which is a repeating pattern of swirling vortices caused by the unsteady separation flow of a fluid around a blunt object, in this case the flow disturber 506 (turbulent flow having higher Reynolds numbers (Re) than laminar flow). It should be noted that the repeating pattern may be periodic or non-periodic, for example, depending on the actuation of the flow disturber 506, which may be controlled as desired or needed to generate different disturbance patterns.

Thus, the sensors 502, 504 are configured to detect vortices in the flow, and in particular, vortices caused by the flow disturber 506. In the illustrated embodiment, three vortices 606a-c are identified. However, additional and different types of vortices at different frequencies may be generated as described herein. As can be seen, the vortex 606a is first detected, then the vortex 606b, then the vortex 606c. This is the case for both of the sensors 502, 504. In particular, the sensors 502, 504 are positioned relative to the flow disturber 506 to detect the vortices 606. When the flow within the conduit 112 is such that a single vortex 606a passes both sensors 502, 504 (and is detected) before the next or subsequent vortex 606b passes the sensor 502 (and is detected), then the processor 136 (shown in FIG. 5) is configured to operate in a first flow regime mode of operation. However, when the flow within the conduit 112 decreases such that multiple vortices, for example, such as the vortices 606a, 606b both pass the sensor 502 before the vortex 606a passes the sensor 504, then the processor 136 is configured to operate in a second flow regime mode of operation. The processing and/or control of the flow disturber 506 may be changed or varied based on the particular determined flow regime, as well as the signal 510, 512 used for determining the flow rate. Thus, various embodiments utilize a time of arrival or frequency of the detected vortices 606 by both of the sensors 502, 504 to determine a flow regime mode of operation or processing for the processor 136.

Figure 7:
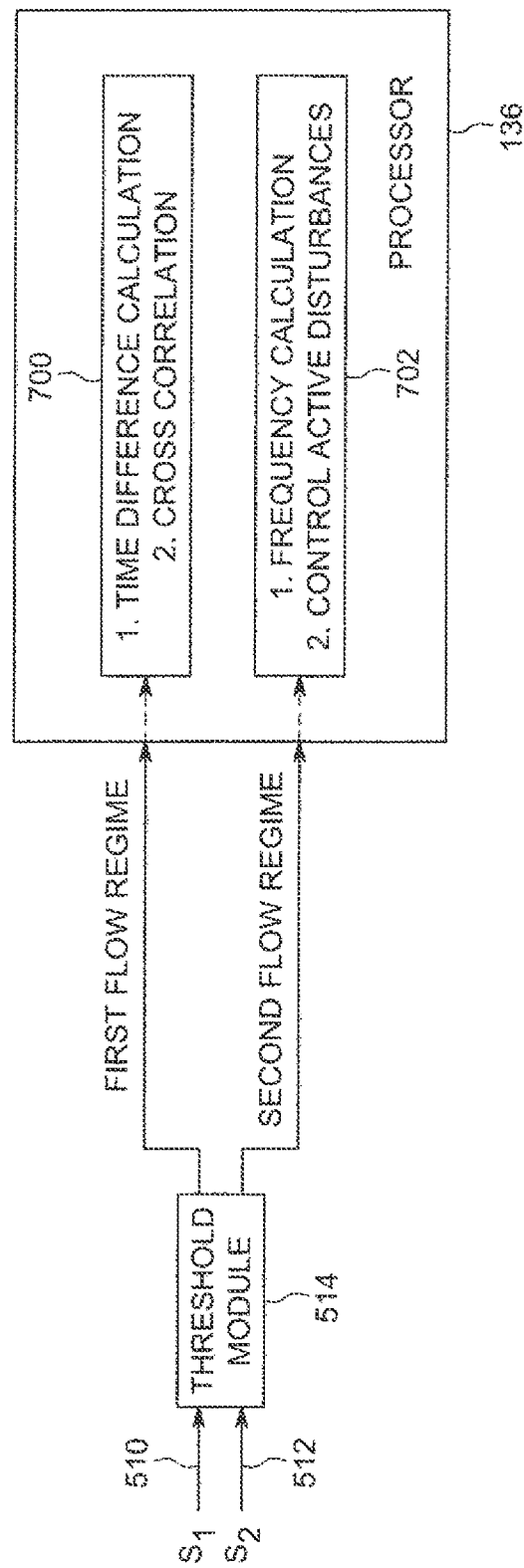
FIG. 7 is a block diagram illustrating a threshold module and processor in accordance with various embodiments.

Thus, for example, as shown in FIG. 7, the threshold module 514, which may be implemented in hardware, software, or a combination thereof, receives the output signals 510, 512 from the sensors 502, 504 respectively and determines which flow regime processing should be performed based on a time of arrival of the vortices as described in more detail in connection with FIG. 6. For example, based on the relative detection of the vortices 606 by the sensors 502, 504, a determination is made whether to use a first flow regime processing and control scheme, which may be implemented by a first flow regime module 700, or to use a second flow regime processing and control scheme, which may be implemented by a second flow regime module 702. Thus, the first flow regime module 700 may be a higher flow rate processing module and the second flow regime module 702 may be a lower flow rate processing module. The first and second flow regime modules 700, 702 may be implemented in hardware, software or a combination thereof and may be implemented as part of or separate from the processor 136.

In particular, if the time of arrival of the vortices 606 is determined to be within the first flow regime, the first flow regime module 700 operates to process the both signals 510, 512 received from the sensors 502, 504, respectively. In some embodiments, the processing includes a time difference calculation. For example, an amplitude threshold may be set, such that if the magnitude of the vortex 606 passing the sensors 510, 512 exceeds a determined or defined threshold, then the vortex 606 is determined to be generated or imparted by the flow disturber 506. Accordingly, by determining the time difference between the arrival of the vortex 606 at the sensors 502, 504, the flow rate can be calculated or inferred as the distance L between the sensors 502, 504 is known (e.g., distance traveled/time difference). As another example, a cross-correlation of the signals 510, 512 may be performed to determine the flow rate based on the time of arrival of the vortex 606. It should be noted that in various embodiments, any suitable method for determining a rate of travel between two sensing points may be used.

If the time of arrival of the vortices 606 is determined to be within the second flow regime, the second flow regime module 702 operates to either process the signals 510, 512 received from the sensors 502, 504, respectively or control the generation of the vortices 606 within the flow conduit 112 by adjusting the flow disturber 506 (e.g., by changing a flapping speed of the flow disturber 506). For example, in one embodiment, either the signals 510 from the sensor 502 or the signals 512 from the sensor 504 are used to determine the flow rate, but not both. In one embodiment, using a frequency calculation of the detected vortices 606 at one of the sensors 502, 504, such as a FFT calculation, the speed of the flow may be determined, as frequency is related to time (T): 1/T. In other embodiments, the active disturbances generated by the flow disturber 506 may be controlled to prevent multiple vortices 606 from passing one sensor 502 before the previous vortices 606 have passed the other sensor 504. For example, the pattern of the vortices 606 may be adjusted such that the frequency between the vortices 606 is lengthened so that the distance traveled d of one vortex before another vortex 606 is generated is greater than the distance L between the two sensors 502, 504.

Figure 8:
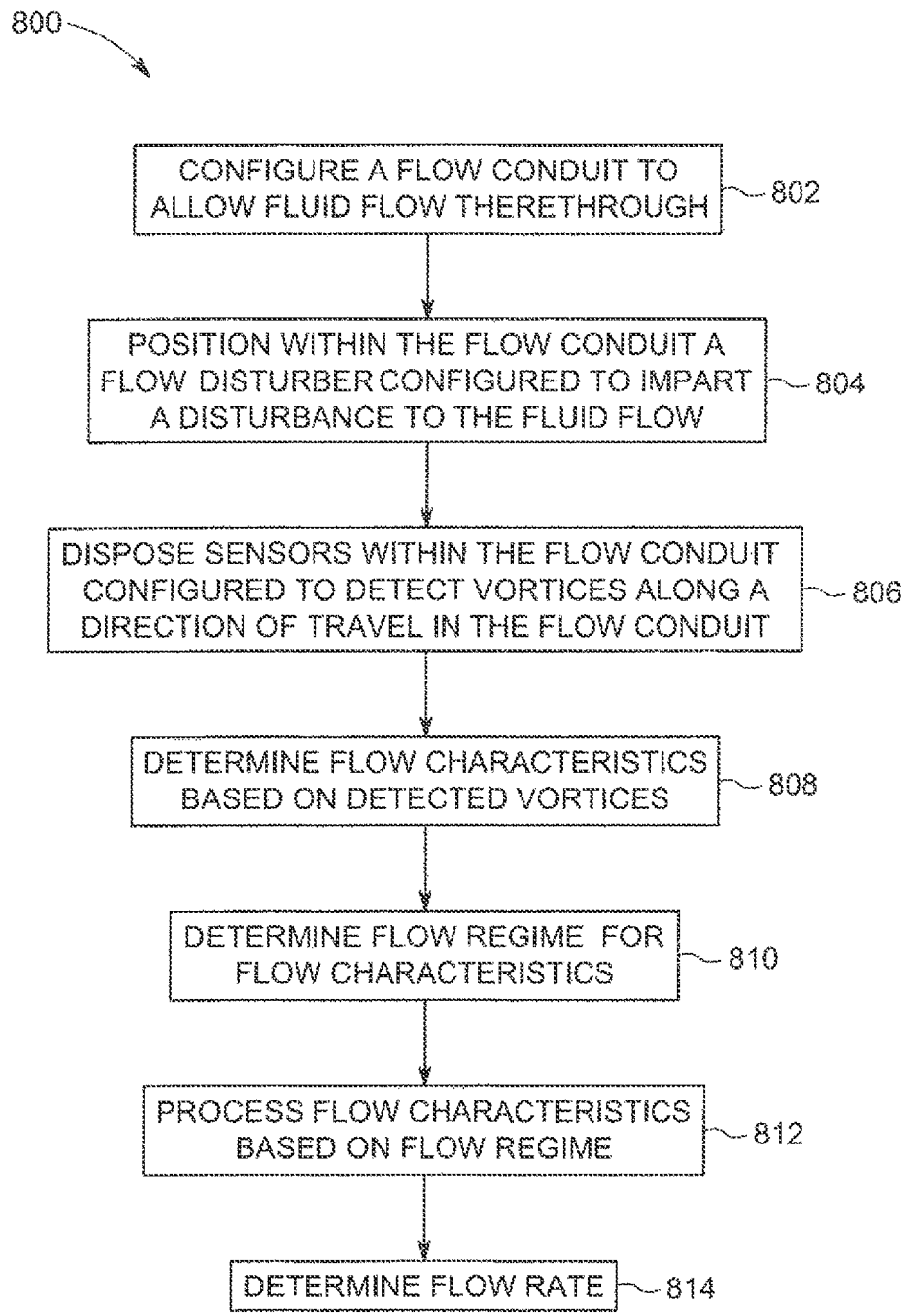
FIG. 8 is a flowchart of a method for determining flow rate in accordance with various embodiments.

Various embodiments provide a method 800 as shown in FIG. 8 for determining flow rate, such as in the flow conduit 112 (shown in FIG. 1). In particular, the method 800 includes configuring a flow conduit to allow fluid flow therethrough at 802. For example, a tube or other fluid transport member may be configured to allow any type of fluid flow therethrough, such as a gas or liquid. In some embodiments, such as in medical applications, the conduit may allow airflow therethrough at varying pressure levels. The method 800 may be implemented with any source and destination of the fluid flow.

The method 800 also includes positioning within the conduit at 804 a flow disturber configured to impart a flow disturbance to the fluid flow. The flow disturber may be a separate component mounted within the conduit in some embodiments. The flow disturber may impart the flow disturbance due to the presence of the flow disturber (e.g., non-moving component) or actively such as by moving, for example, by rotating or tilting within the conduit. The flow disturber may be sized and shaped differently, such as based on the fluid flowing through the conduit or the type of disturbance to be imparted to the fluid flow. Additionally, more than one flow disturber may be placed within the conduit at different axial locations along the conduit.

The method 800 also includes disposing at 806 sensors within the conduit to detect vortices along a direction of travel in the flow conduit, which in some embodiments are generated by an active flow disturber as vortices within the flow conduit 112. The detecting includes using the plurality of sensors as described herein that are along a single direction of travel of the flow. For example, in various embodiments, measurements from multiple sensors along the direction of travel of the disturbances are obtained.

The method 800 also includes determining flow characteristics based on the detected vortices at 808. For example, as described herein, based on the generated or imparted disturbances, amplitude, frequency, or time characteristics of the vortices may be determined by a processor using measured signals from the sensors. The measured signals may be used to perform thresholding and to determine, for example, a time of arrival of the vortices. A flow regime is then determined or selected at 810 for the determined flow characteristics, such as by a processor. For example, time of arrival information may be used to determine if a single vortex detection condition or a multiple vortex detection condition exists as described in more detail herein.

The flow characteristics are processed at 812 based on the determined or selected flow regime, such as by the processor. The processing may also include controlling the flow disturber to change the generated disturbances, such as to change the pattern or frequency of the vortices. Based on the selected flow regime one or more calculations may be performed at 814, such as by the processor, to determine the flow rate as described herein. For example, different algorithms or processing schemes may be used as described herein that employ characteristics of the sensor response in the particular flow regime.

Figure 9:
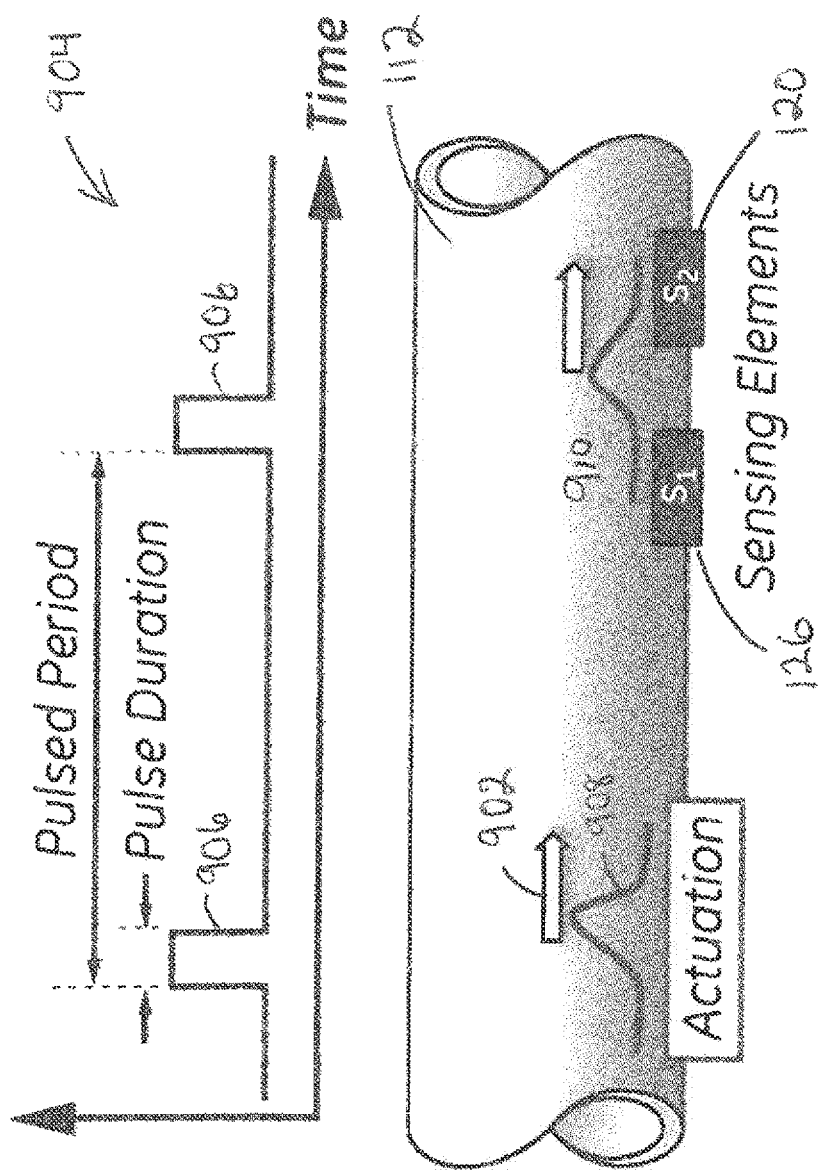
FIG. 9 is a schematic illustration of a flow sensor showing timing information used in accordance with various embodiments.
Figure 10:
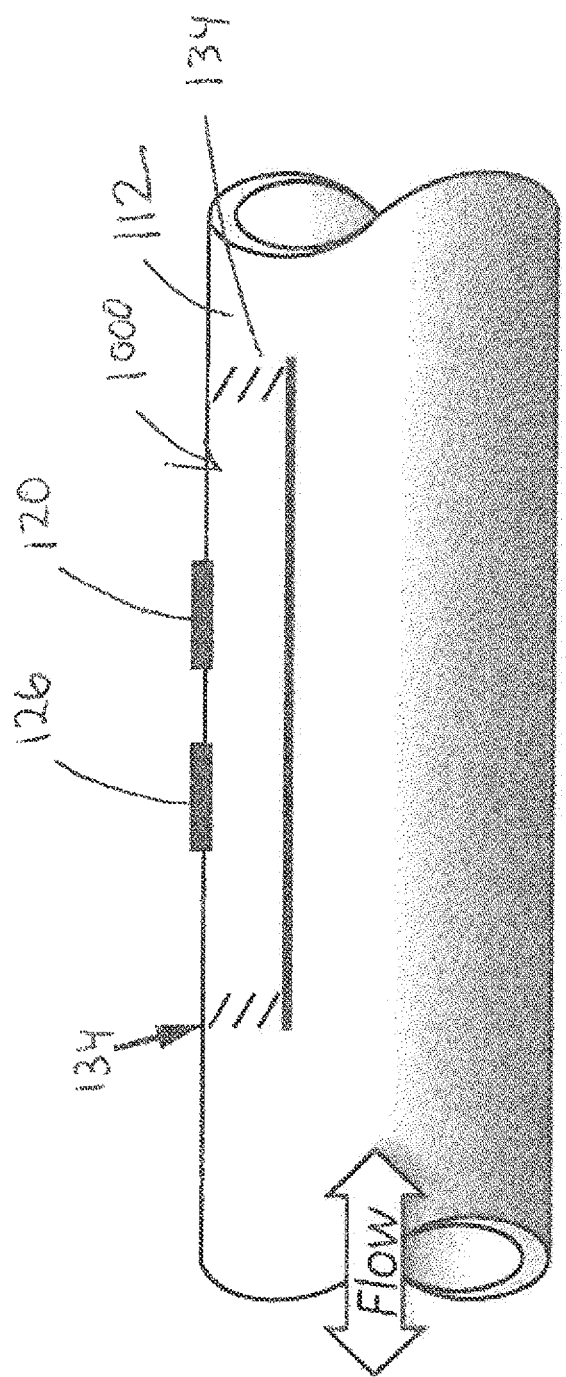
FIG. 10 is a schematic illustration of a flow sensor in accordance with various embodiments having a bypass channel.

Thus, various embodiments use multiple sensors per flow direction to determine a flow rate, such as within a flow conduit. Using time of arrival information, as well as different characteristics of the measured vortices, different calculations or controls may be performed to determine the flow rate. For example, as described in more detail herein, one or more sensors, such as the two sensors 120 and 126 (shown in FIG. 9), are disposed within a flow conduit 112 at first and second positions to have a geometrical and functional relationship with the flow conduit 112 and a flow disturber 134 (shown in FIG. 1) within the flow conduit 112. The flow disturber 134 generates an actuation signal, which in various embodiments imparts a disturbance to the fluid flow (illustrated by the arrow 902), such that in some embodiments vortices along the direction of travel in the flow conduit 112 are detected by the sensors 120 and 126.

As illustrated by the graph 904, and as described herein, the sensors 120 and 126 are responsive to the flow characteristics within the flow conduit 112 to generate corresponding signals used to determine, for example, a flow rate within the flow conduit 112. More particularly, various embodiments may use timing characteristics as illustrated by the graph 904 to select a processing method for determining the flow rate as described herein. In some embodiments, the sensors 120 and 126 detect a disruption in the fluid flow using certain characteristics created by the disruption, which may include vortices or pressure/flow pulses 906 that can be sensed and analyzed over time (where the X-axis of the graph 904 represents time and the Y-axis of the graph 904 represents amplitude). Thus, as can be seen in the graph 906, various embodiments detect and analyze pulses 906 that are spaced apart in time and that travel along the flow conduit 112. For example, and as described herein, some embodiments may use the pulse duration (e.g., width of each of the pulses 906) and/or the pulse period (e.g., time between detection of the pulse 906 by the sensors 120 and 126 and/or start of a subsequent pulse 906) for analysis.

It should be noted that the graph 904 illustrates, for example, the detection of a single pulse 906 at each of the sensors 120 and 126 as the pulse 906 travels along the flow conduit 112. As described herein, one or more pulses 906 are detected or sensed by the sensors 120 and 126, which may include detecting or sensing more than one pulse 906 at the sensor 126 before sensing a next pulse at the sensor 120, or vice versa.

Various embodiments may control the pulses 906 as described herein. For example, as illustrated by the curves 908 and 910, the flow disturber 134 may be controlled to broaden the pulse 906 from the actuation point to the detection point at the sensors 120 and 126. Additionally, it should be noted that in various embodiments, non-periodic modes of operation may be provided.

In some embodiments, a bypass channel 100 may be provided wherein a portion of the fluid flow within the flow conduit 112 passes into and through the bypass channel 1000. As can be seen, the sensors 120 and 126 may be positioned in relation to the bypass channel 1000, for example, within the bypass channel 1000. Additionally, flow disturbers 134 (e.g., one or more MEMS devices or actuators) may be positioned with respect to the bypass channel 1000.

Figure 11:
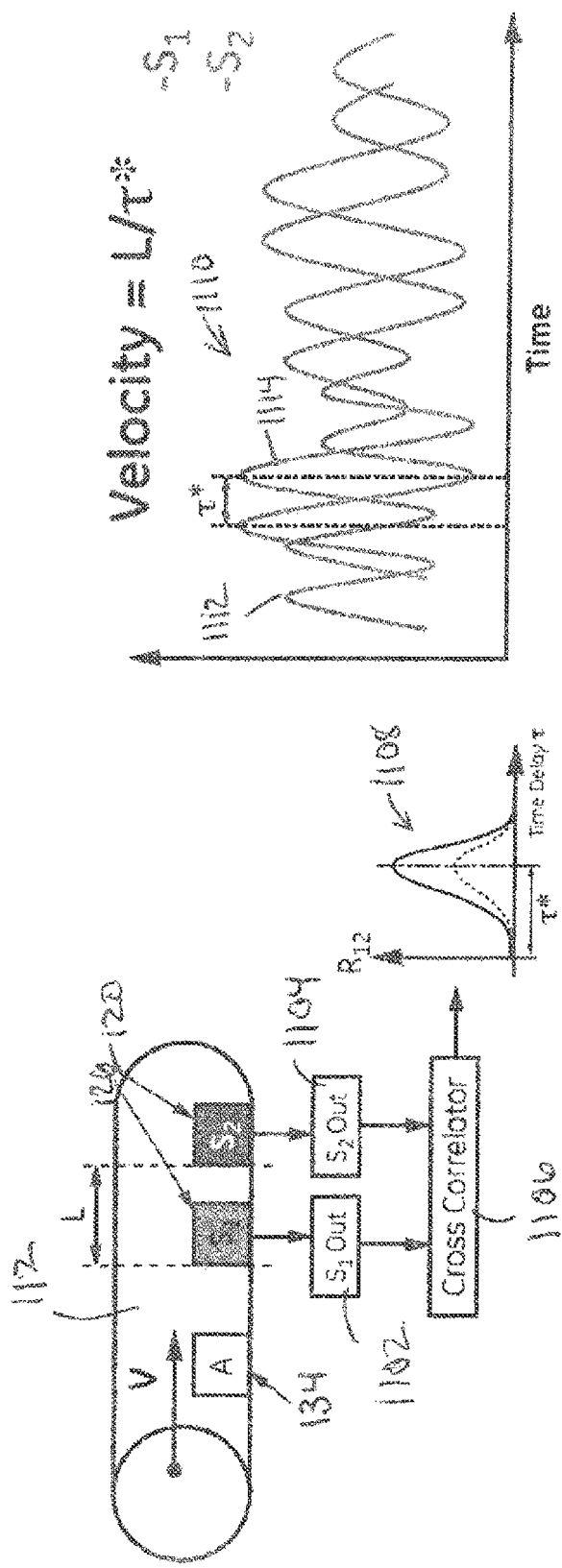
FIG. 11 is a schematic illustration of a flow sensor in accordance with various embodiments showing measurement waveforms for performing cross-correlation analysis in accordance with various embodiments.

Using the detected pulses 906, for example, a cross-correlation flow sensor arrangement may be provided, such as shown in FIG. 11, wherein sensor output signals 1102 and 1104 are processed by a cross-correlator module 1106 (that may be implemented in hardware and/or software, such as embodied as the processor 136 or part of the processor 136 shown in FIG. 1). As can be seen by the graph 1108 (where the X-axis corresponds to time difference or delay and the Y-axis corresponds to amplitude), and as described in more detail herein, various embodiments determine a maximum amplitude of $\tau^*$, which is the duration between when the pulse 906 is detected by the sensors 126 and 120. For example, as shown in the graph 1110 (where the X-axis corresponds to time difference or delay and the Y-axis corresponds to amplitude), the curves 1112 and 1114 correspond to the output signals 1102 and 1104, respectively, of the sensors 126 and 120. In various embodiments, as illustrated in the graph 1110, a cross-correlation is performed to determine the time at which the maximum amplitude of $\tau^*$ occurs.

In some embodiments, the velocity is determined by the correlation time ($\tau^*$) between the sensors 126 ($s_1$) and 120 ($s_2$) using the cross correlation $$R_{12}(\tau) = \frac{1}{T}\int_0^1 s_1(t-\tau)s_2(t)dt$$

(or equivalently the location of the maximum of $R_{12}(\tau)$), where $s_1$ and $s_2$ are the outputs of the sensors 126 and 120. It should be noted that in the presence of a noise source or spurious signal, $\eta$, $s_2 \rightarrow s_2+\eta$, the flow rate calculation will remain unchanged since the cross correlation $$R_{12}(\tau) \rightarrow \frac{1}{T}\int_0^1 s_1(t-\tau)[s_2(t)+\eta(t)]dt$$

and the location $\tau^*$ of the maximum remain invariant, $R_{12}(\tau) \rightarrow R_{12}(\tau)$. Similarly, when the signal undergoes a scaling error (e.g., drifting sensors), $s_1 \rightarrow As_1$, $s_2 \rightarrow Bs_2$, the flow sensing result remains robust and invariant as the location $\tau^*$ of the maximum of the cross correlation remains unchanged, $$R_{12}(\tau) \rightarrow \frac{1}{T}\int_0^1 As_1(t-\tau)Bs_2(t)dt \equiv ABR_{12}(\tau).$$

Figure 12:
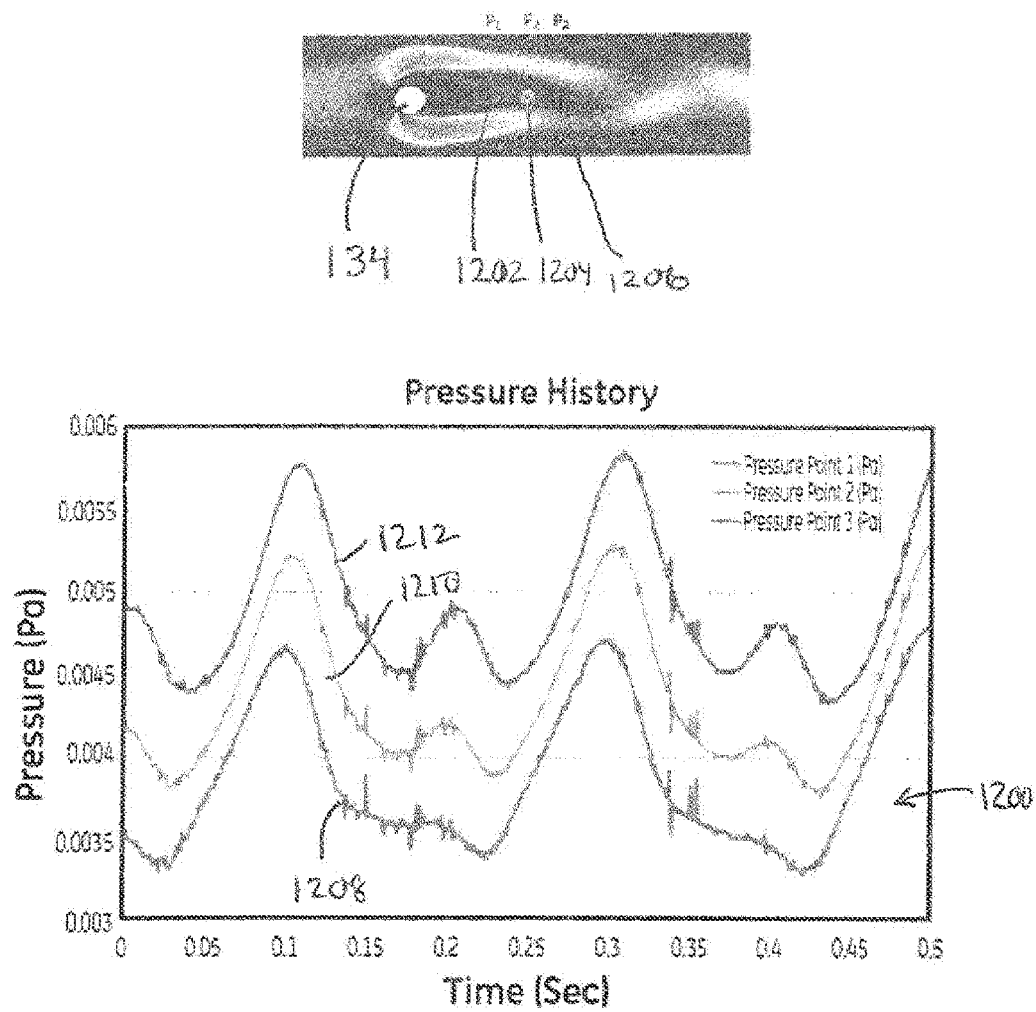
FIG. 12 illustrates simulation results for one or more embodiments.

FIG. 12 illustrates a graph 1200 (where the X-axis corresponds to time in seconds and the Y-axis corresponds to amplitude or a measured pressure in Pascal (PA)) of finite element (FE) simulation results for disturbances created or formed by the flow disturber 134 and measured by the sensors 1202, 1204 and 1206 using various embodiments. It should be noted that in this simulation, the movement of the flow disturber 134 is linearly within the flow conduit 112 (e.g., vertically upwards and downwards to create pulses). It should also be noted that the spacing and location of the sensor 1202, 1204, and 1206 may be varied, for example, as described herein and not positioned within the center of the flow conduit 112. The curves 1208, 1210 and 1212 correspond to the measurements or detections by the sensors 1202, 1204 and 1206, respectively. The curves 1208, 1210 and 1212 show the delay between the sensor nodes defined by the positioning of the sensors 1202, 1204 and 1206 downstream of the flow disturber 134. As can be seen, each of the curves 1208, 1210 and 1212 has multiple peaks that may be analyzed as described herein, for example, cross-correlated.

Figure 13:
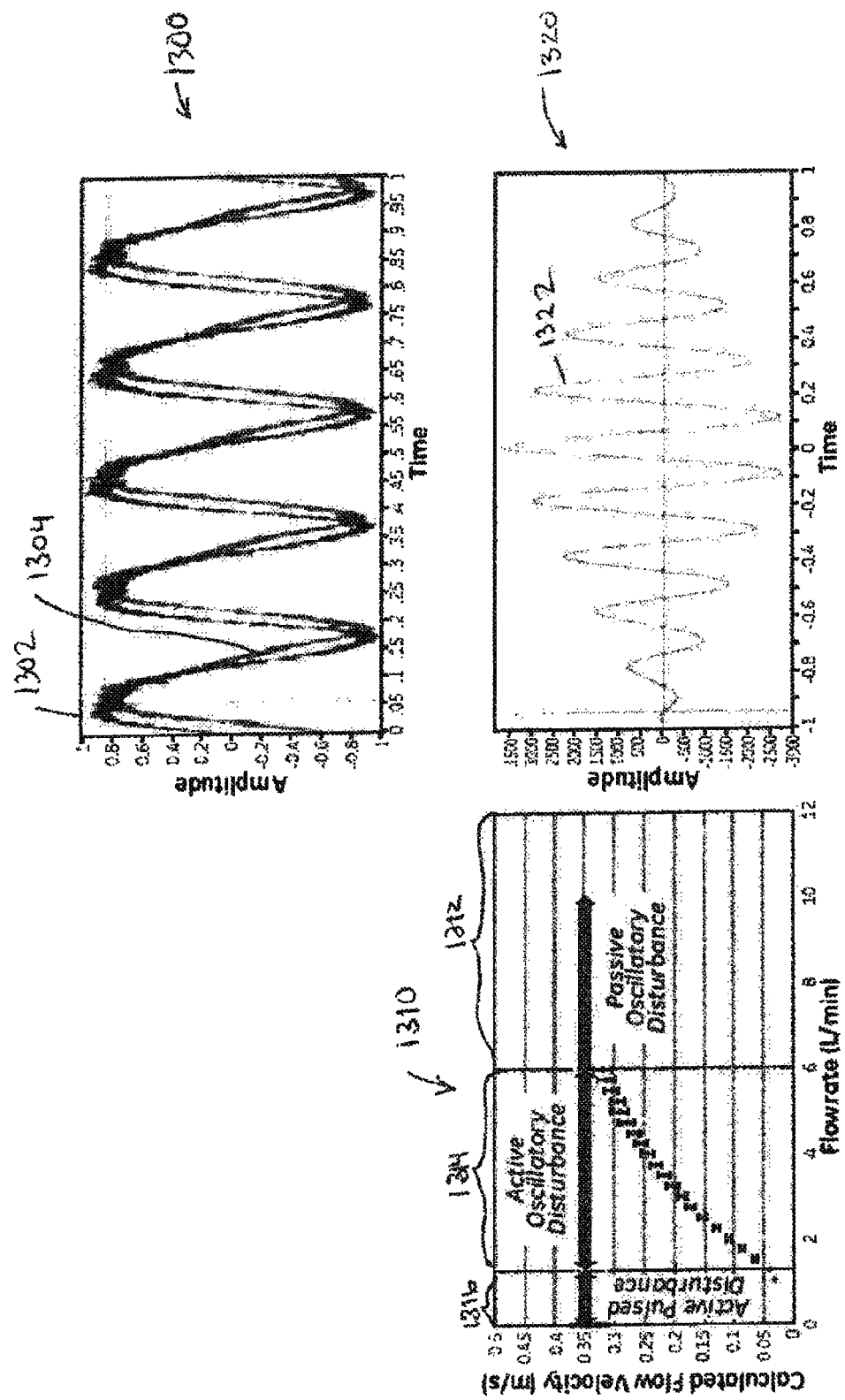
FIG. 13 illustrates experimental results using a moving flow disturber in accordance with various embodiments.

FIG. 13 illustrates experimental results in accordance with various embodiments, for example, using one or more embodiments described herein. In particular, the graph 1300 (where the X-axis corresponds to time in seconds and the Y-axis corresponds to amplitude) shows measurement results. It should be noted that in this experiment, the movement of the flow disturber 134 is also linearly within the flow conduit 112 (e.g., vertically upwards and downwards to create pulses). The curves 1302 and 1304 correspond to the measurements or detections by sensors, such as the sensors 126 and 120 (shown in FIG. 1), which as can be seen results in two waveforms (e.g., generally sinusoidal waveforms). The spacing between the curves 1302 and 1304 corresponds to the delay between the detections by the sensors 126 and 120.

The graph 1310 (where the X-axis corresponds to flow rate and the Y-axis corresponds to calculated flow velocity) shows the results of cross-correlation calculations performed as described herein. In the graph 1310, different flow regimes are illustrated such that in various embodiments received signals corresponding to the flow disturbances are analyzed using different characteristics to determine fluid flow rate depending on the flow regime (e.g., defined by ranges of flow levels) within the flow conduit 112. For example, in the portion 1312, a regime is defined wherein passive oscillatory disturbances are formed (such that disturbances are formed in the flow without moving the flow disturber 134). In the portion 1314, a regime is defined wherein active oscillatory disturbances are formed (e.g., by moving the flow disturber 134, such as linearly). It should be noted that in this regime corresponding to the portion 1314, the disturbances, such as the vertices, no longer are formed as a result of a reduced flow rate and the disturbances are actively formed by moving the flow disturber 134. For example, the flow disturber 134 may be moved in an oscillatory manner (versus the pulsed manner illustrated by the results of FIG. 12, which corresponds to the regime associated with the portion 1316 wherein active pulsed disturbances are formed). Using one more embodiments, and performing analysis of the measured disturbances, and based on, for example, the flow regime, a cross-correlation analysis may be performed as described in more detail herein with the results shown by the curve 1322 of the graph 1320 (where the X-axis corresponds to time and the Y-axis corresponds to amplitude). Using the curve 1322 (which as can be seen is less noisy than the curves 1302 and 1304) showing the cross-correlation results, $\tau^*$ may be determined as occurring at the time when the curve 1322 has a maximum value or peak.

Figure 14:
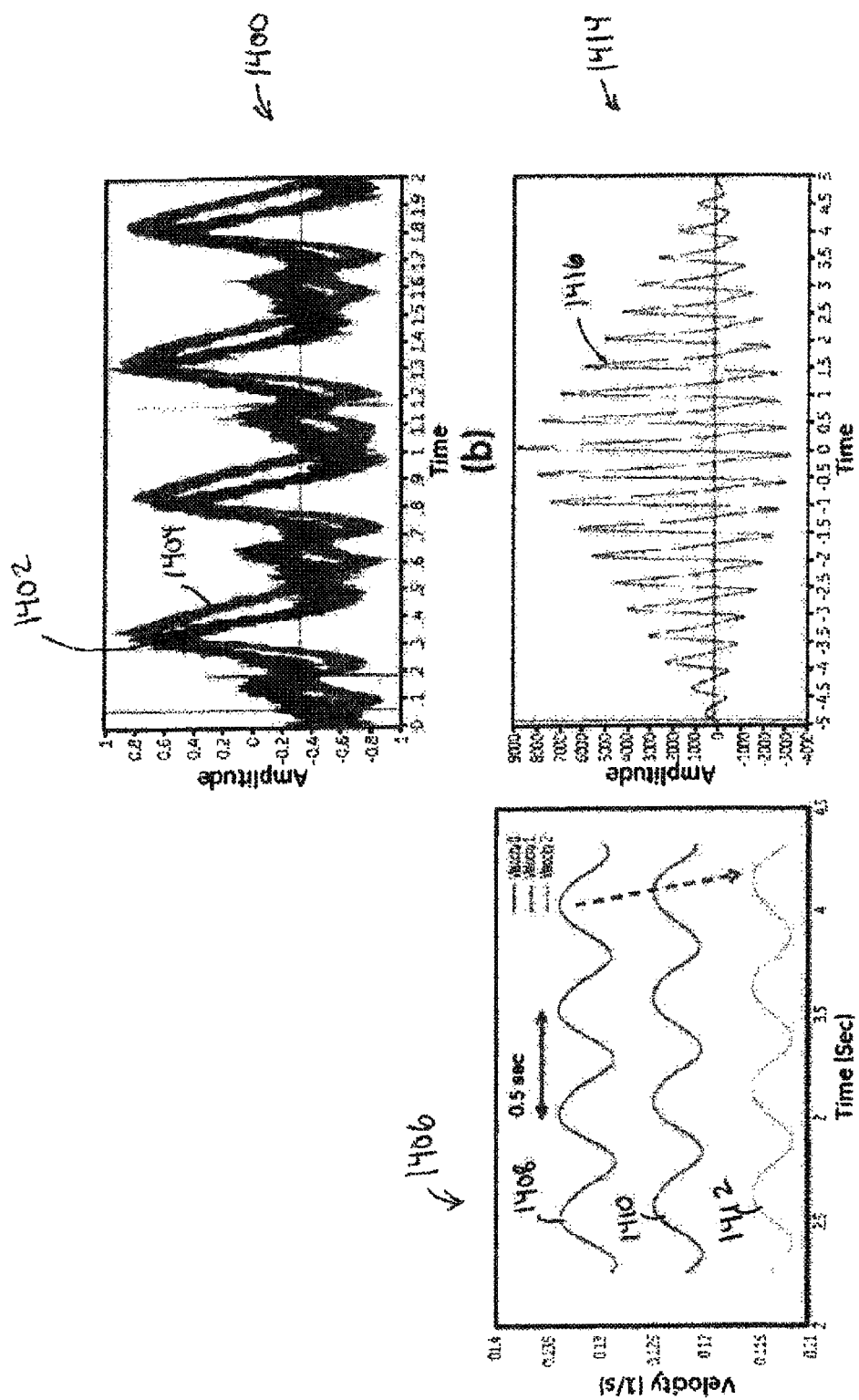
FIG. 14 illustrates simulation and experimental results using a moving flow disturber in accordance with various embodiments.

FIG. 14 illustrates FE simulation results (shown in the graph 1406) and experimental results (shown in the graph 1400) in accordance with various embodiments, for example, using one or more embodiments described herein. However, the flow disturber 134 rotates instead of moves in a linear manner. In particular, the graph 1400 (where the X-axis corresponds to time in seconds and the Y-axis corresponds to amplitude) shows measurement results. The curves 1402 and 1404 correspond to the measurements or detections by sensors, such as the sensors 126 and 120 (shown in FIG. 1), which as can be seen results in two waveforms (e.g., generally sinusoidal waveforms). The spacing between the curves 1402 and 1404 corresponds to the delay between the detections by the sensors 126 and 120.

The graph 1406 (where the X-axis corresponds to time in seconds and the Y-axis corresponds to velocity) shows FE simulation results for disturbances created or formed by the flow disturber 134 and measured by three sensors using various embodiments (instead of the two sensors of the experimental results shown in the graph 1400). The curves 1408, 1410 and 1412 correspond to the measurements or detections by the sensors. The curves 1408, 1410 and 1412 show the delay between the sensor nodes defined by the positioning of the sensors downstream of the flow disturber 134. As can be seen, each of the curves 1408, 1410 and 1412 has multiple peaks that may be analyzed as described herein, for example, cross-correlated.

Using one more embodiments, and performing analysis of the measured disturbances, and based on, for example, a flow regime, a cross-correlation analysis may be performed as described in more detail herein with the results shown by the curve 1416 of the graph 1418 (where the X-axis corresponds to time and the Y-axis corresponds to amplitude). Using the curve 1416 (which as can be seen is less noisy than the curves 1402 and 1404) showing the cross-correlation results, $\tau^*$ may be determined as occurring at the time when the curve 1322 has a maximum value or peak.

It should be noted that variations and modifications are contemplated. For example, measurements from the different flow regimes may be used for calibrations. In particular, different flow thresholds may be selected based on when vortices are formed within the conduit and calculations performed, such that an overlap region may be used to interpolate a linear relationship in the different regimes by using amplitude characteristics of the measured signals. This information may be used to calibrate the sensors below the threshold where vortices are not formed such that a mass flow may be calculated using calibrated volumetric flow information, such as described in co-pending patent application Ser. No. 13/247,107 filed on Sep. 28, 2011, entitled "FLOW SENSOR WITH MEMS SENSING DEVICE AND METHOD FOR USING SAME".

Various embodiments may use flow sensors, such as in a flow sensor assembly for flow detection. For example, if the flow sensor assembly is being used in a CPAP or VPAP machine, the sensors of various embodiments may be used to determine flow. However, the various embodiments may be implemented in different types of flow sensor systems.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and/or non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:
1. A flow sensor assembly comprising:
a flow conduit configured to allow fluid flow therethrough;
a flow disturber disposed in the flow conduit and configured to impart a flow disturbance to the fluid flow; said fluid flow having flow characteristics and timing characteristics responsive to the flow disturbance;
an actuator operably connected to the flow disturber to control the flow disturber to impart the flow disturbance to the fluid flow;
a plurality of sensors disposed in the flow conduit that are configured to have a geometrical and functional relationship with the flow conduit and the flow disturber, the plurality of sensors being responsive to the flow characteristics in the flow conduit; and
a processor operably coupled to the plurality of sensors and configured to determine a flow rate of the fluid flow in the flow conduit, the processor using the timing characteristics to select one of a plurality of processing methods for determining the flow rate.
2. The flow sensor assembly of claim 1, wherein the processor is further configured to determine the flow rate using sensor signal characteristics from a sensor response of the plurality of sensors, the sensor signal characteristics includ- ing at least one of amplitude characteristics, the timing characteristics, or frequency characteristics.

3. The flow sensor assembly of claim 2, wherein the processor is further configured to select the processing method based on one of a plurality of flow regimes, wherein the processing method uses at least one of the sensor signal characteristics in the flow regime for the selected processing method.

4. The flow sensor assembly of claim 3, wherein the processor is further configured use sensor signals from the plurality of sensors in one of the plurality of flow regimes to calibrate sensor signals from the plurality of sensors in a different one of the plurality of flow regimes.

5. The flow sensor assembly of claim 4, wherein one of the plurality of flow regimes has a range of flow rates that is less than and partially overlapping a range of flow rates of a different one of the plurality of flow regimes.

6. The flow sensor assembly of claim 1, further comprising a second flow disturber.

7. The flow sensor assembly of claim 1, wherein the actuator is configured to modulate the disturbance generated by the flow disturber.

8. The flow sensor assembly of claim 7, wherein the actuator is configured to modulate the disturbance by imparting a motion on the flow disturber, wherein the motion includes at least one of a rotation, an oscillation, a vibration, a flapping motion, a pumping, or a pulsing.

9. The flow sensor assembly of claim 7, wherein the actuator is configured to modulate the disturbance by injecting into the fluid flow at least one of a pulse of heat, a puff of air, a pressure pulse, or a chemical tracer.

10. The flow sensor assembly of claim 7, wherein the actuator is configured to modulate the disturbance based on a flow regime.

11. The flow sensor assembly of claim 1, wherein the processor is further configured to use one of a fast Fourier transform (FFT) function or a cross-correlation function of signals responsive to the flow characteristics based on the selected processing method.

12. The flow sensor assembly of claim 1, wherein the flow disturber comprises one of a blunt flow disturber or a planar flow disturber.

13. The flow sensor assembly of claim 1, wherein the flow disturber comprises a first part separated from a second part forming a channel or gap therebetween.

14. The flow sensor assembly of claim 1, wherein the plurality of sensors are one of microelectromechanical (MEMS) sensors, heaters, temperature sensors, or pressure sensors.

15. The flow sensor assembly of claim 1, wherein the processor is further configured to determine a flow direction of the fluid flow through the flow conduit.

16. A method for determining fluid flow, the method comprising:
configuring a flow conduit to allow fluid flow therethrough;
positioning within the flow conduit a flow disturber configured to impart a flow disturbance to the fluid flow; said fluid having flow characteristics and timing characteristics responsive to the flow disturbance;
providing a plurality of sensors within the flow conduit, the plurality of sensors configured to detect along a direction of travel in the flow conduit, flow disturbances including vortices; and
processing signals responsive to the detected flow disturbances by selecting from one of a plurality of processing methods to determine a flow rate of the fluid flow in the flow conduit, the processing including using timing characteristics related to the detected disturbances to select a processing method for determining the flow rate.

17. The method of claim 16, further comprising determining the flow rate using sensor signal characteristics of a sensor response of the plurality of sensors, the sensor signal characteristics including at least one of amplitude characteristics, the timing characteristics, or frequency characteristics, the processing method selected based on one of a plurality of flow regimes, wherein the processing method uses at least one of the sensor signal characteristics in the flow regime for the selected processing method.

18. The method of claim 17, further comprising using the sensor signals from the plurality of sensors in one of the plurality of flow regimes to calibrate sensor signals from the plurality of sensors in a different one of the plurality of flow regimes.

19. The method of claim 16, further comprising configuring the actuator to modulate the disturbance generated by the flow disturber to impart a motion on the flow disturber, wherein the motion includes at least one of a rotation, an oscillation, a vibration, a flapping motion, a pumping, or a pulsing.

20. The method of claim 16, further comprising configuring the actuator to modulate the disturbance by injecting into the fluid flow at least one of a pulse of heat, a puff of air, a pressure pulse, or a chemical tracer.

21. The method of claim 16, further comprising using one of a fast Fourier transform (FFT) function or a cross-correlation function of signals responsive to the flow characteristics based on the selected processing method.

22. A non-transitory computer readable storage medium for flow rate determination with a plurality of flow sensors in a flow conduit using a processor, the non-transitory computer readable storage medium including instructions to command the processor to:
detect vortices in the flow conduit using the plurality of flow sensors;
determine flow characteristics based on the detected vortices;
determine a flow regime for the flow characteristics based on timing characteristics of the detected vortices; and
process the flow characteristics based on the determined flow regime by selecting from one of a plurality of processing methods to determine a flow rate within the flow conduit.

23. A flow sensor assembly comprising:
a flow conduit configured to allow fluid flow therethrough;
a flow disturber disposed in the flow conduit;
an actuator operably connected to the flow disturber to control the flow disturber to impart a flow disturbance of a certain frequency to the fluid flow, said fluid flow having flow characteristics responsive to the flow disturbance; and
a plurality of sensors disposed in the flow conduit and configured to have a geometrical and functional relationship with the flow conduit and the flow disturber, the plurality of sensors being responsive to flow characteristics of the fluid flow in the flow conduit.

* * * * *